Figure 1:
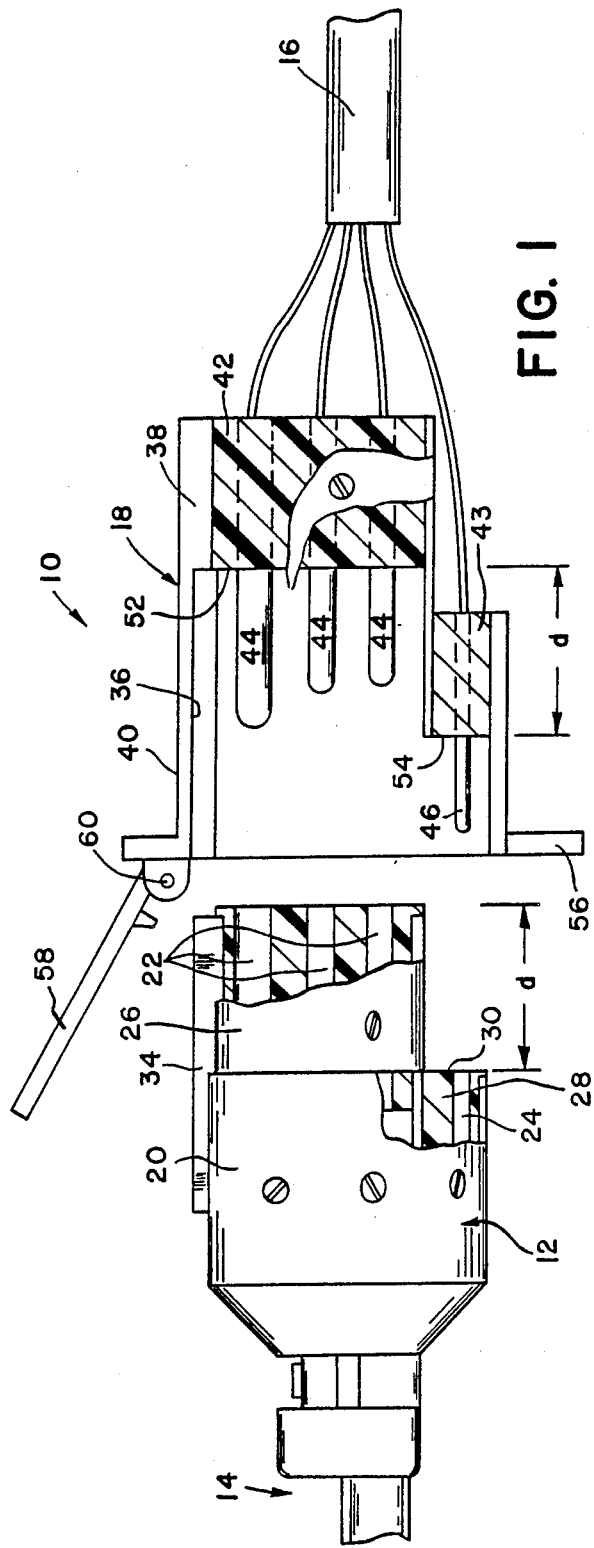

United States Patent [19]

Krause

[11] Patent Number: 4,842,532
[45] Date of Patent: Jun. 27, 1989

[54] ELECTROPNEUMATIC JUMPER CABLE CONNECTORS

[75] Inventor: Jeffrey J. Krause, Westlake, Ohio

[73] Assignee: Allied-Signal Inc., Morristown, N.J.

[21] Appl. No.: 97,771

[22] Filed: Sep. 17, 1987

[51] Int. Cl.$^4$ .............................................. H01R 29/00
[52] U.S. Cl. ........................................ 439/174; 439/35
[58] Field of Search ............ 439/34, 35, 144, 173–177, 439/217, 222, 223, 381, 640, 680, 653

[56] References Cited

U.S. PATENT DOCUMENTS 4,245,875  1/1981  Shaffer et al. ................... 439/144

Primary Examiner—Eugene F. Desmond
Attorney, Agent, or Firm—Ken C. Decker; William N. Antonis

[57] ABSTRACT

An electrical connector for connecting the cables interconnecting the tractor and trailer portion of a combination vehicle includes axially offset portions, each of which carries a set of electrical conductors. The conductors in one of the portions provide the standard electrical connections between the portions of the vehicle for tail lights, turn signals, etc. Conductors in the other portion provide the connections for an electropneumatic actuated braking system. The offset portions are designed so that the portion carrying the connections for the tail lights, stop lights, turn signals, etc are compatible with existing connectors so that a portion of the vehicle equipped with an electropneumatic system may be used with another portion of the vehicle which is not equipped with an electropneumatic braking system.

5 Claims, 1 Drawing Sheet

ELECTROPNEUMATIC JUMPER CABLE CONNECTORS

This invention relates to an electrical plug and jack assembly which are used to connect the jumper cables interconnecting the tractor and trailer portions of a combination vehicle.

Existing heavy duty tractor-trailer combination vehicles are normally equipped with air brakes in which a pneumatic signal generated by operation of the foot control valve effects actuation of the brakes of both the tractor and trailer. However, it has been proposed that braking systems actuated by pneumatic signals be replaced by a system in which electrical signals effect a brake application. In such an electropneumatic system, it is necessary to transmit several signals between the tractor and trailer.

Of course, existing tractor-trailer combination vehicle also require electrical connections between the tractor and trailer. Existing vehicles are equipped with connectors which provide seven conductors to connect electrical circuits on the tractor to the electrical circuits on the trailer. These circuits, for example, provide grounding, provide power to the clearance, side marker, and identification lamps, turn signals, stop lights, hazard signals, and tail and license plate lamps, and provide an auxiliary conductor for powering other devices that might be carried on the trailer. Obviously, the proposed electrical-pneumatic system, which will require as yet an undefined number of additional conductors, will require a substantial modification in the existing connectors. However, any connector design for a vehicle equipped with an electropneumatic braking system should be compatible with existing connectors. For example, a trailer equipped with an electropneumatic system may have to be pulled by a tractor not equipped with an electropneumatic system, and a tractor equipped with an electropneumatic system must be able to pull a trailer which is not equipped with an electropneumatic system. Accordingly, the connectors should be compatible with one another.

The present invention provides cable connectors which are capable of providing the additional conductors necessary for operation of the proposed electropneumatic systems, but which can also accommodate existing cable connectors used on tractor-trailer combination vehicles which are not equipped with an electropneumatic braking system. This and other advantages of the present invention will become apparent from the following specification with reference to the accompanying drawings, in which FIG. 1 is an elevational view, partly in section, of a a cable connector and mating receptacle made pursuant to the present invention; and FIG. 2 is a cross-sectional view taken substantially along lines 2—2 of FIG. 1.

Referring now to the drawings, a cable connection system for a tractor-trailer combination vehicle is indicated generally by the numeral 10 and includes a plug assembly 12 connected to one of the cables 14, which is to be connected to the other cable 16 through the receptacle assembly generally indicated by the numeral 18. The plug 12, normally carried by the tractor portion of a combination vehicle, includes a housing 20 which carries a first set of electrical contacts 22 and a second set of electrical contacts 24. The electrical contacts 22, 24 are recessed into the housing 20 and are adapted to receive corresponding projecting portions of the receptacle assembly 18. The electrical contacts 22 are mounted in a substantially cylindrical portion 26 of the housing 12, and the electrical contacts 24 are mounted in circumferentially extending portion 28 of the housing 20 which partially circumscribes the portion 28 of the plug housing 20 which is substantially cylindrical and which projects from the remainder of the plug housing 20 towards the receptacle assembly 18. Accordingly, the forward face 30 of the portion 28 of member 20 is offset a distance d from the forward face 32 of the cylindrical portion 26. Accordingly, the portion 28 of housing 20 is offset both radially and axially with respect to the cylindrical portion 26. The plug assembly 12 further carries a radially projecting key 34 which engages a corresponding slot 36 on the receptacle assembly 18 when the plug and receptacle assemblies are coupled together. The key 34 properly orients the electrical contacts 22, 24 when the plug and receptacle assemblies are connected together.

The receptacle assembly 18, normally mounted on the trailer portion of the combination vehicle, includes a housing 38 having a circumferentially extending projecting portion 40 which circumscribes axially offset recessed portions 42, 43. A first set of electrical contact members or prongs 44 project from the face 52 of the recessed portion 42. A second set of electrical contact members 46 project from a face 54 of the portion 43. As can be seen in FIG. 1, the offset between the forward end 52 of the recessed portion 42 and the forward end 54 of the recessed portion 43 is substantially the same as the offset distance d between the faces 30, 32 of the plug assembly 12. The circumferentially extending portion 40 terminates in a mounting flange 56 which is secured to the body of the trailer or other device upon which the receptacle is mounted. A door 58 is mounted on the flange 56 by a hinge 60 so that the door automatically closes to protect the receptacle 18 when the plug 12 is removed.

Figure 2:
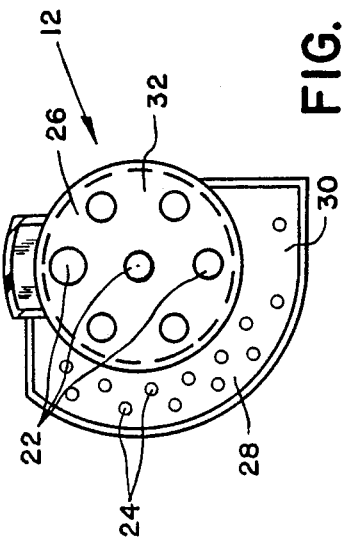

When the cables 14 and 16 are to be connected together, the plug and receptacle 12, 18 are oriented as illustrated in FIG. 1 and the keyway 36 is oriented to receive the key 34. Accordingly, since the offset d between the faces 30 and 32 of the plug 12 is substantially the same as the offset between the forward ends 52, 54 of the offset portions 42, 43 of the receptacle 18, the plug and receptacle may be coupled together and the corresponding electrical contact members 46 will be received in corresponding electrical contacts 24 and the electrical contact members 44 will be received in corresponding electrical contact openings 22. Accordingly, electrical contact between all conductors in the cables 14, 16 is assured.

It will be appreciated that the cylindrical portion 26 is exactly the same diameter and has the conductors 22 positioned in exactly the same relative position as do existing cable connectors used on virtually all heavy duty trucks operated in North America. Accordingly, a vehicle equipped with an electropneumatic system will be provided with both a set of electrical contacts 22, and a set of electrical contacts 24, and the other portion of the vehicle will be provided with corresponding sets of electric contact members 44, 46. However, if the portion of the vehicle including the receptacle assembly 18 is equipped with an electropneumatic system and the portion of the vehicle including plug assembly 12 is not equipped with an electropneumatic braking system, the portion of the vehicle not equipped with an electropneumatic system will be equipped with a cylindrical connector of the same diameter and conductor placement as the cylindrical portion 26. Accordingly, that connector will be received by the receptacle 18, with the electrical contact members 44 being received in corresponding electrical contacts 22. The electrical contact members 46 will, accordingly, be disconnected, but since only the portion on which the member 12 is mounted is not equipped with electropneumatic system, and since the electrical contact members 46 are only associated with an electropneumatic system, the normal pneumatic actuation system will be used and it is not necessary for the electrical members 46 to be connected.

Similarly, if the portion on which the plug assembly 12 is installed is equipped with an electropneuamtic system and the portion of the vehicle carrying the receptacle is not equipped with an electropneumatic system, the receptacle member 18 will be equipped with electrical contacts 44, but will not be equipped with electrical contact members 46. The cylindrical portion of the plug 12, namely 26, which carries the electrical contacts 22 will mate with the receptacle 18 with electrical contacts 44. Accordingly, the normal electrical connections can be made between tractor and trailer in this case also, but, of course, there will be no connection with the electrical contacts 24 associated with the electropneumatic system. Since full electropneumatic contact is not completed, the normal pneumatic actuation will still be used.

Although the invention has been described with respect to a plug and receptacle in which all contacts carry electrical signals, one or more of the contacts may be designed to carry other types of signals, such as fiber optic or pneumatic signals. For example, the contacts 22, 44 may carry electrical signals, while the contacts 24, 26 may carry fiber optic signals.

We claim:

1. A connecting member for connecting with either of a pair of junction members, one of said junction members having both first and second sets of contacts, the other of said junction members having only one set of contacts corresponding to said first set of contacts of said one junction member, said connecting member comprising a body having a first portion carrying a first set of contact members and a second portion carrying a second set of contact members, said second portion of said connecting means being offset from said first portion of said connecting member to permit connection of said first set of contact members with the set of contacts of said other junction members while leaving said second set of contact members disconnected and to permit connection of both the first and second sets of the contact members with the first and second sets of contacts of said one junction member, said body having an axis, said second portion being offset axially with respect to said first portion.

2. A connecting member as claimed in claim 1, wherein said second portion is also offset radially with respect to said first portion.

3. A connecting member as claimed in claim 1, wherein axial insertion of said body into either of said junction members is limited to a predetermined distance, said predetermined distance being substantially the same in both of said junction members, said predetermined distance being substantially the same as the axial offset between said first and second portions.

4. A receptacle for connection with either of a pair of plugs, one of said plugs having both first and second sets of contact members, the other plug having only one set of contact members corresponding to said first set of said contact members of said one plug, said receptacle comprising a housing, said housing defining a bore having an axis, said bore having an opening receiving said plug, said bore defining a pair of faces offset axially from one another with said bore, a first set of contacts carried by one of said faces, a second set of contacts carried by the other of said faces and offset axially from said first set of contacts a distance equal to the axial offset between said faces to establish an axial offset distance between said first and second sets of contacts, whereby said receptacle is capable of accommodating said other plug to engage said first set of contact members with the first set of contacts while leaving said second set of contacts of said receptacle unconnected, the first and second sets of contact members of said plug being offset a distance equal to said offset distance to permit engagement of said first and second sets of contact members with the first and second sets of contacts.

5. Receptacle as claimed in claim 4, wherein said second set of contacts is offset radially from said first set of contacts.

* * * * *